Patented July 20, 1954

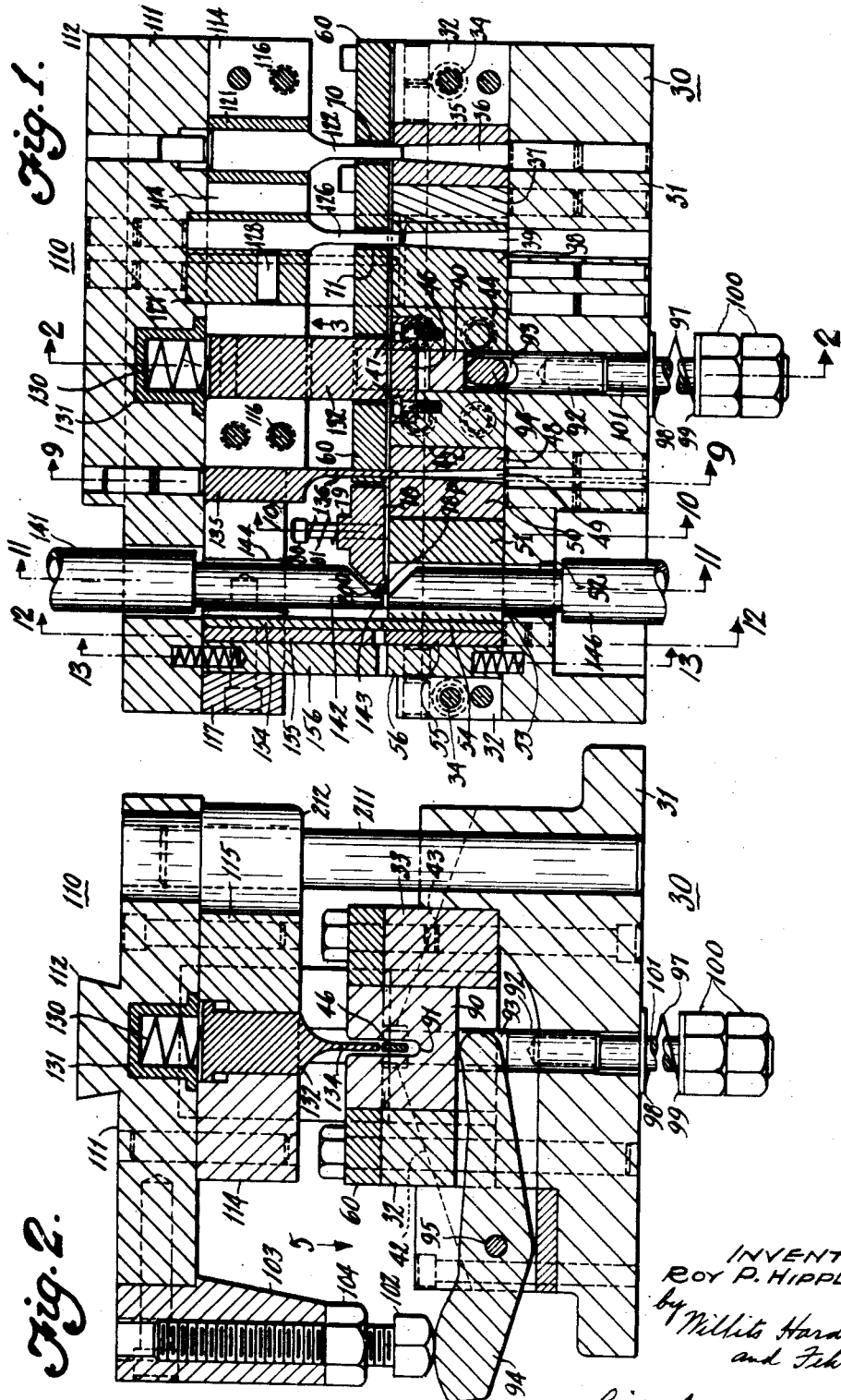

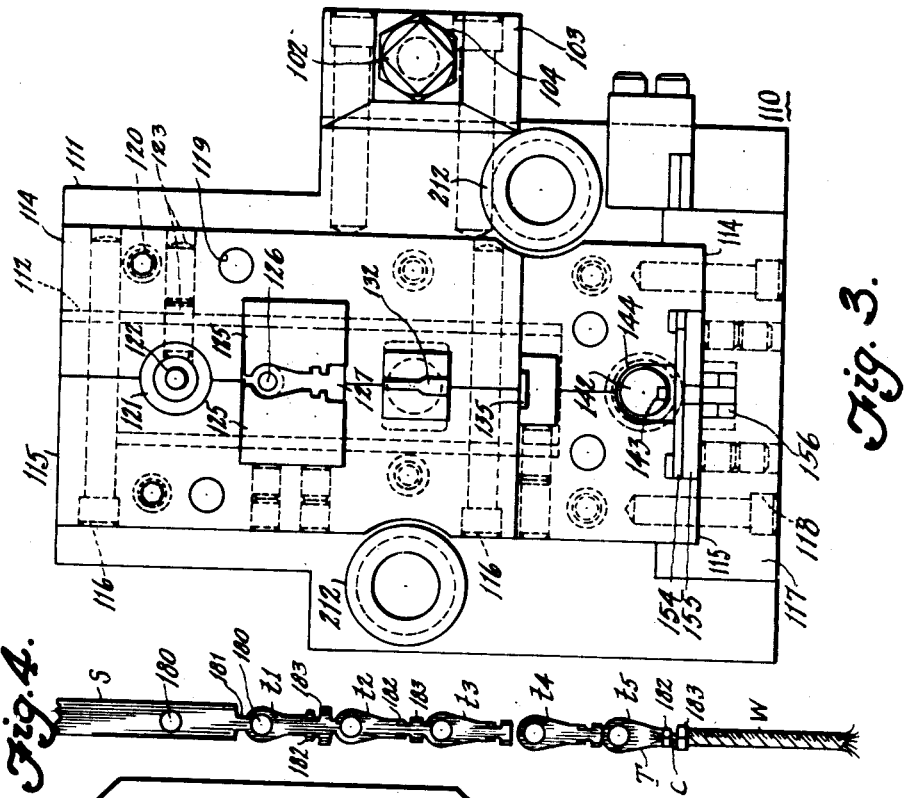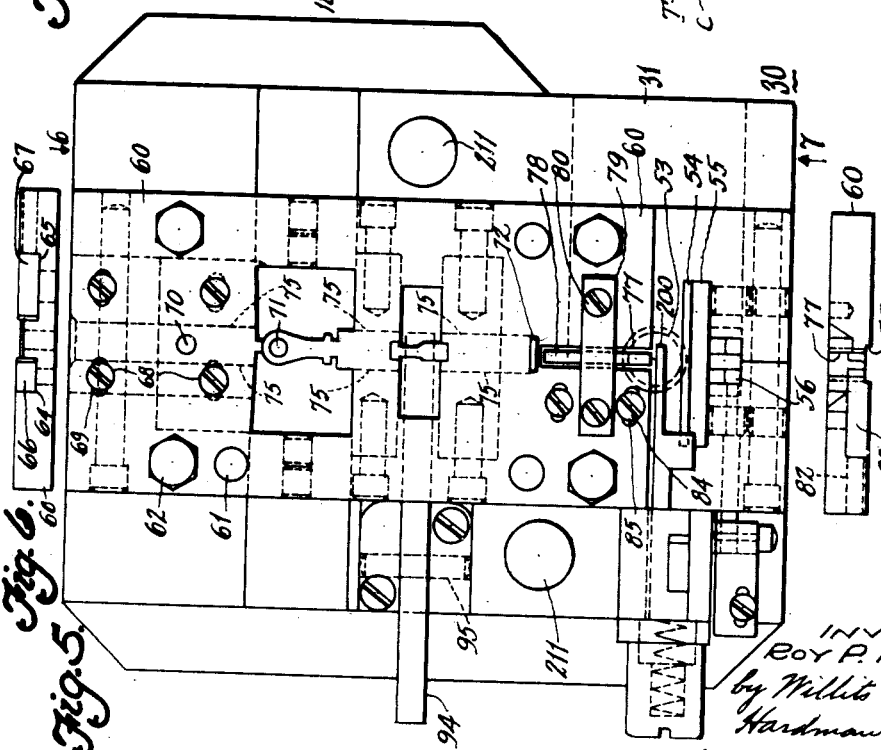

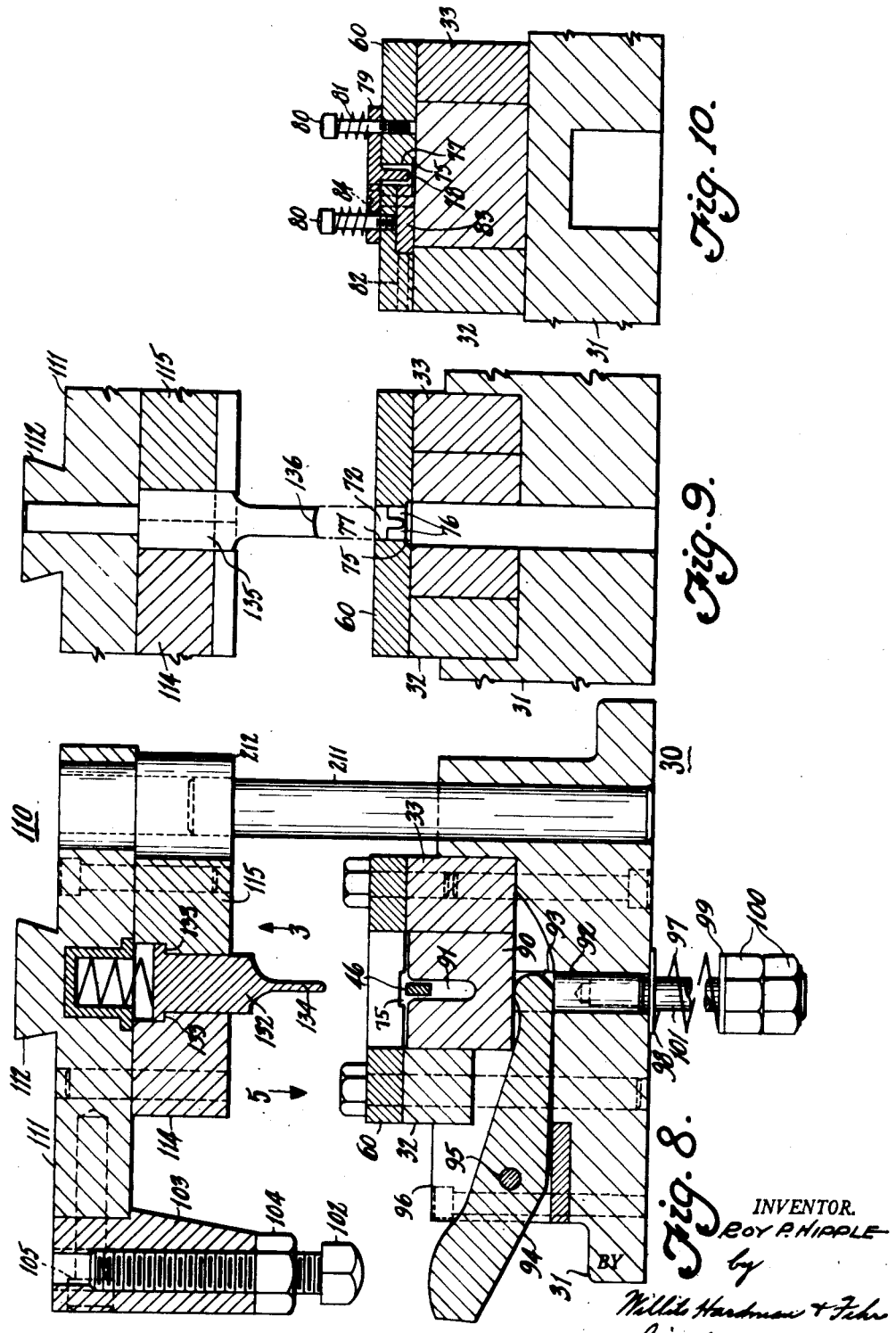

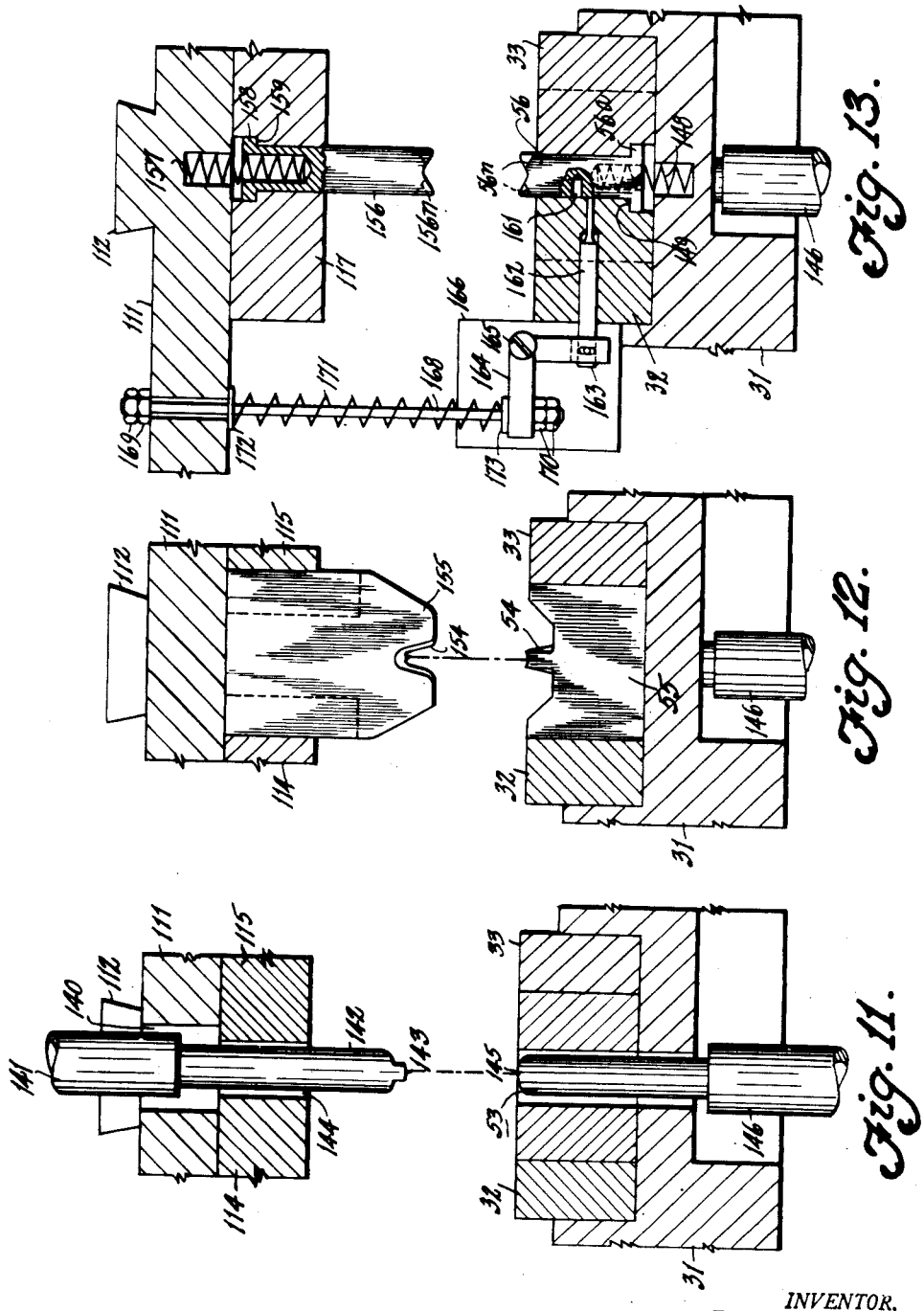

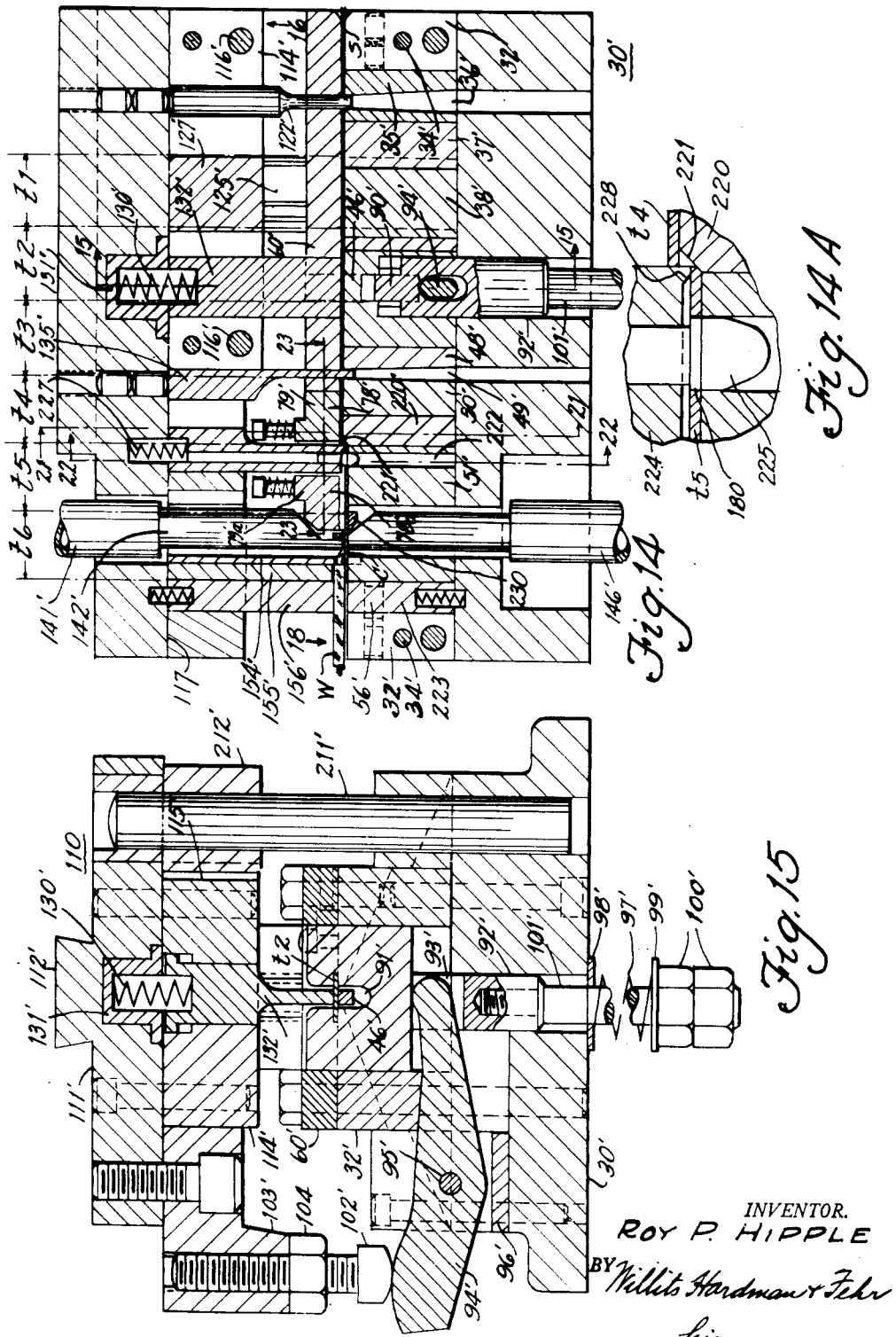

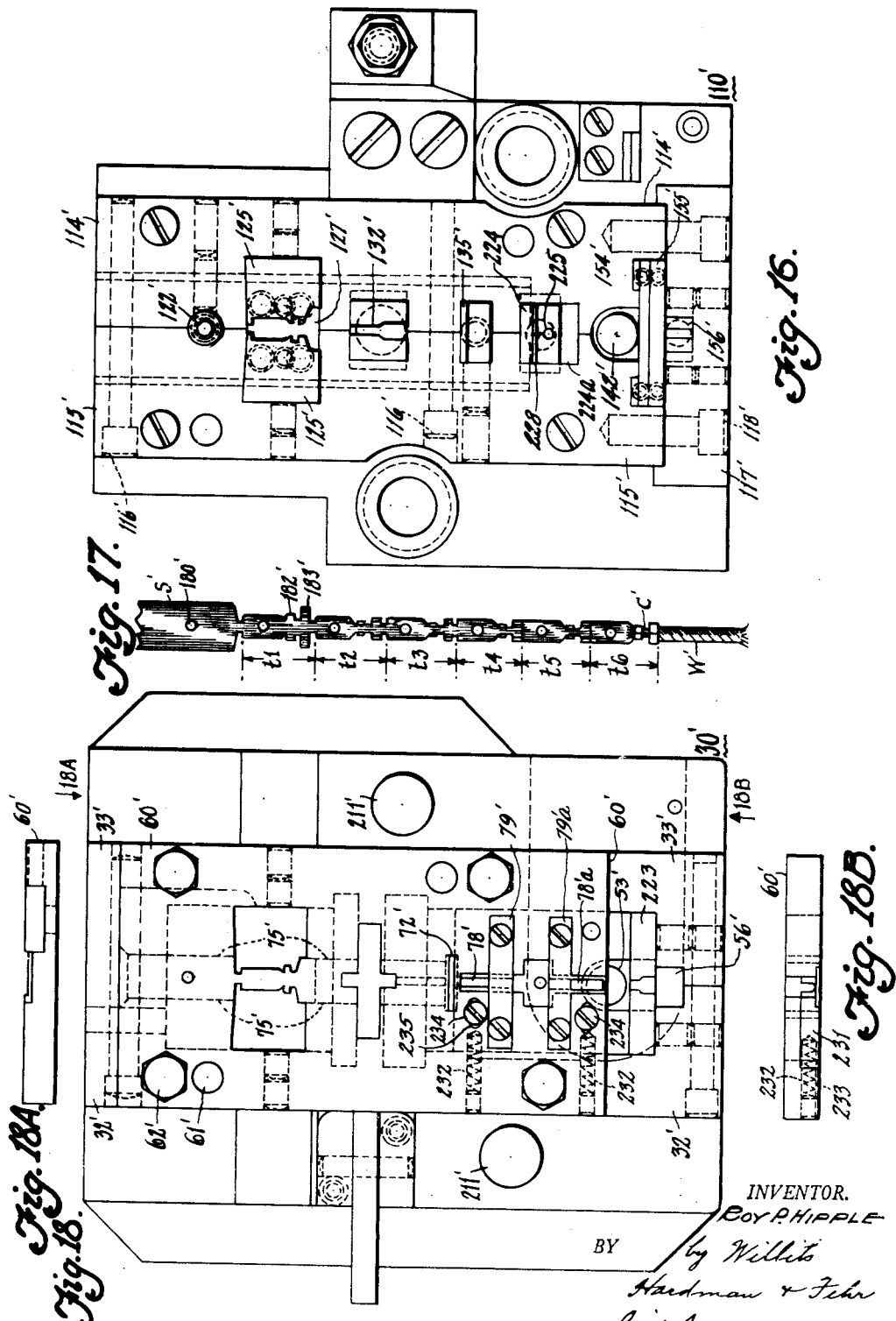

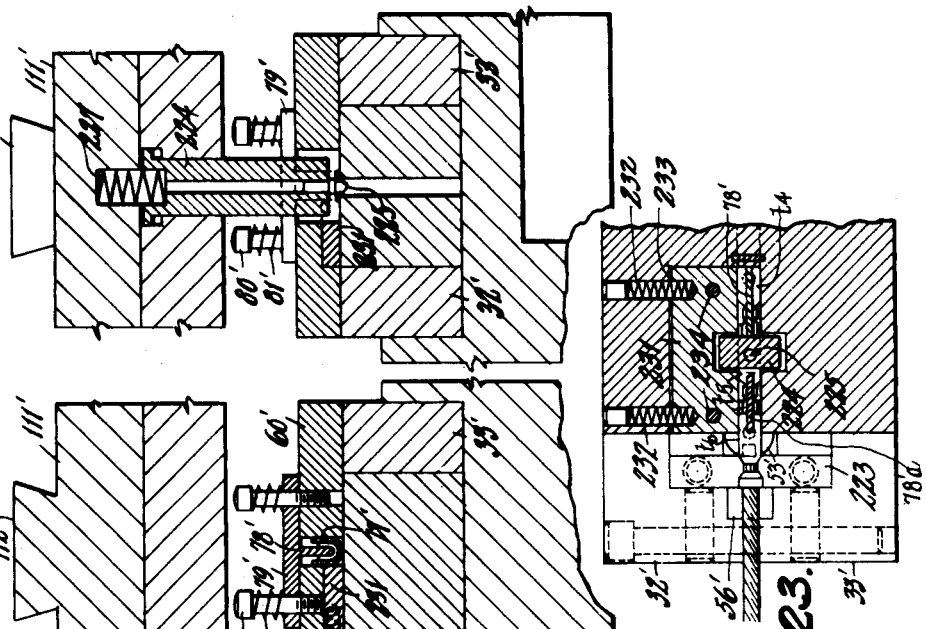
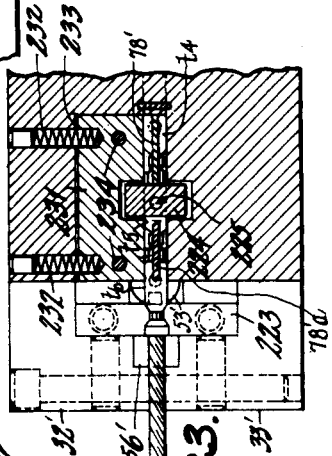
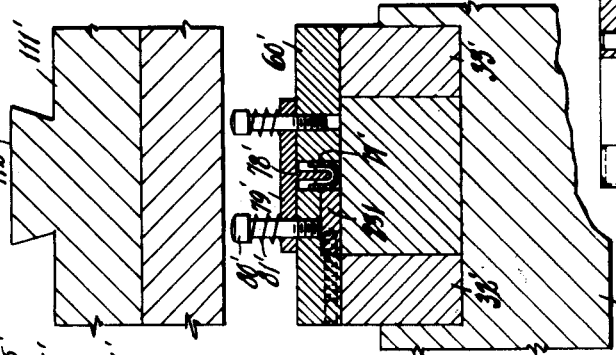
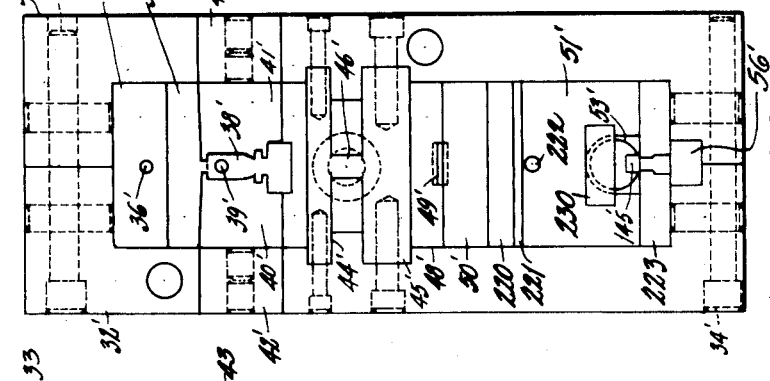
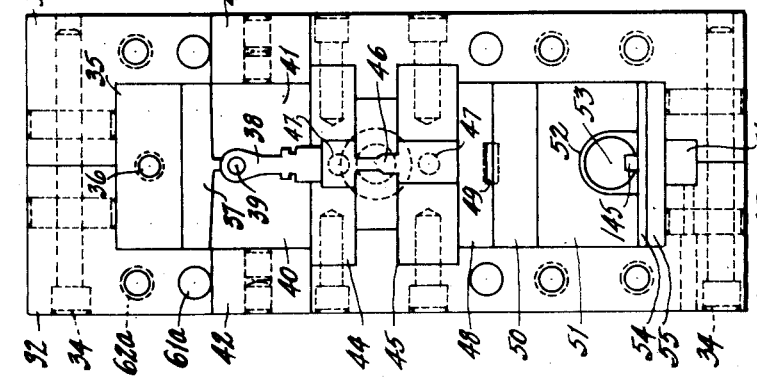

2,684,423

UNITED STATES PATENT OFFICE 2,684,423

APPARATUS FOR FORMING TERMINALS AND ATTACHING SAME TO WIRES

Roy P. Hipple, Warren, Ohio, assignor to General Motors Corporation, Detroit, Mich., a corporation of Delaware Application May 5, 1951, Serial No. 224,753

5 Claims. (Cl. 219—4)

1

This invention relates to the art of manufacturing terminals from strip sheet metal and for mechanically and electrically connecting them with a wire.

My copending application Serial No. 175,093, filed July 21, 1950, discloses apparatus by which a strip of sheet metal is progressively shaped to form a terminal having pairs of wings which are adapted to be bent to grip, respectively, the insulation of the wire and the bared cored portion thereof. This apparatus includes means for severing the terminal from the strip fed by the press and means for guiding the severed terminal to a station where the terminal is attached to a wire by bending the wings and the bared portion of the wire is welded to the terminal.

An object of the present invention is to provide modifications of the apparatus shown in my copending application in order that other forms of terminals may be made and attached to wires.

Further objects and advantages of the present invention will be apparent from the following description, reference being had to the accompanying drawings wherein preferred embodiments of the present invention are clearly shown.

In the drawings:

Fig. 1 is a longitudinal sectional view of lower and upper punch and die assemblies embodying one form of the present invention.

Fig. 2 is a sectional view on line 2—2 of Fig. 1.

Fig. 3 is a bottom view of the upper die assembly shown in Fig. 1.

Fig. 4 is a view showing the operations progressively performed upon a sheet metal strip to produce a terminal and the attachment of the terminal to a wire.

Fig. 5 is a plan view of the lower die assembly.

Figs. 6 and 7 are views, respectively, in the directions of arrows 6 and 7 of Fig. 5, showing end views of the stripper plate which is fastened to lower die assembly.

Fig. 8 is a view similar to Fig. 2 showing separation of the die assemblies.

Figs. 9 through 13 are, respectively, sectional views on the lines 9—9 through 13—13 of Fig. 1.

Fig. 14 is a longitudinal sectional view of lower and upper punch and die assemblies embodying a modified form of the invention. Fig. 14A is an enlargement of a portion of Fig. 14.

Fig. 15 is a sectional view on line 15—15 of Fig. 14.

Fig. 16 is a bottom view of the upper die assembly shown in Fig. 14.

Fig. 17 is a view showing the progressive shaping of a sheet metal strip to form a terminal and the attachment of the terminal to a wire.

Fig. 18 is a plan view of the lower die assembly of Fig. 14.

Figs. 18A and 18B are, respectively, views in the directions or arrows 18A and 18B of Fig. 18.

Fig. 19 is a plan view of a sub-assembly included in the lower die of Fig. 1.

Fig. 20 is a plan view of a sub-assembly included in the lower die of Fig. 14.

Figs. 21, 22 and 23 are, respectively, sectional views on lines 21—21, 22—22 and 23—23 of Fig. 14.

Referring to Fig. 1, the lower die assembly 30, which is adapted to be attached to the bed of a punch press not shown, comprises a shoe 31 upon which a die block holder is mounted. This die block holder comprises blocks 32 and 33 (Fig. 19) which are joined by screws 34. Blocks 32 and 33 retain between them a die block 35 having a hole 36, a die block 37 and a punch 38 having a hole 39 and supported between blocks 40 and 41 whose upper surfaces are downwardly inclined from punch 38 so that metal cuttings will gravitate therealong and upon the similarly inclined surfaces 42 and 43 of blocks 32 and 33.

Plates 44 and 45 supported by blocks 32 and 33 support a bridge 46 attached to these blocks by screws 47. Blocks 32 and 33 support a die block 48 having a punch receiving notch 49, a spacer block 50, a spacer block 51 providing a notch 52 for receiving a welding electrode 53, crimping anvils 54 and 55 and wire clamping member 56.

A stripper plate 60 (Fig. 5) is secured to blocks 32 and 33 by locating dowels 61 and screws 62 received, respectively, by holes 61a and tapped holes 62a of blocks 32 and 33 (Fig. 19). As shown in Fig. 6, plate 60 provides recesses 64 and 65, respectively, receiving stock guide inserts 66 and 67 secured to plate 60 by screws 68 passing through slots 69 in plate 60 and threadedly engaging the inserts 66 and 67. The slots 69 provide for adjustment of the spacing of inserts 66 and 67 so as to provide a channel of the correct width for receiving a stock strip S (Fig. 4). Plate 60 has a punch receiving hole 70 aligned with punch receiving hole 36 of die block 35 (Fig. 19) and a punch receiving hole 71 aligned with hole 39 (Fig. 19) and a punch receiving slot 72 aligned with slot 49 (Fig. 19).

As shown in Fig. 9, plate 60 provides a strip receiving channel 75 shown also in Fig. 5, channels 76 for receiving the wings 182, 183 (Fig. 4) of the terminal, when bent upwardly, and a notch 77 which, as shown in Fig. 10, receives a rib 78 integral with a plate 79 located by the shanks of screws 80 threaded into plate 60 and surrounded by springs 81 which urge the plate 79 downwardly. Plate 60 provides a recess 82 for receiving a guide insert 83 retained in laterally adjusted position by screws 84 (Fig. 7) threadedly received by insert 83 and passing through slots 85 in plate 60.

Referring to Fig. 8, blocks 32 and 33 guide a vertically movable terminal wing yoke 90 having a notch 91 which receives the bridge 46. Die 90 has a shank 92 providing a notch 93 for receiving an end of a rocker arm 94 pivoted on a dowel 95 supported by a block 96 attached to shoe 31. Die 90 is normally held down as shown in Fig. 8, by a spring 97 defined between washers 98 and 99 engaging, respectively, the shoe 31 and nuts 100 threaded on a stud 101 threadedly engaging the shank 92. Rocker arm 94 is moved counterclockwise by downward movement of a screw 102 threaded into a bracket 103 and retained in adjustment by a lock nut 104. Bracket 103 is attached by screws 105 to punch holder 111 of the upper die assembly 110.

Referring to Fig. 1, the holder of the upper die assembly 110 has a dovetail rib 112 (Fig. 2) by which attachment is made to the ram of a punch press which supports the assembly 110. Punch holder 111 supports a punch plate comprising blocks 114 and 115 secured together by screws 116 and by an end cap block 117 which screws 118 attach to blocks 114 and 115. Punch plate blocks 114 and 115 are secured to holder 111 by dowels 119 and screws 120.

Blocks 114 and 115 retain a bushing 121 (Fig. 3) which receives a punch 122 secured by set screws 123 and located in alignment with hole 70 of plate 60 and hole 36 in die block 35. Blocks 114 and 115 retain dies 125 which cooperate with punch 38 (Fig. 19) and a punch 126 received by hole 71 of plate 60 and hole 39 of punch 38. Punch 126 is retained by a screw 128 (Fig. 1) in a block 127 which spaces the dies 125 as shown in Fig. 3.

Punch holder 111 receives a spring retaining bushing 131 which receives a spring 130 which urges downwardly a pressure pad 132 against shoulders 133 (Fig. 8) provided by blocks 114 and 115. Pad 132 has a narrow rib 134 which forces the terminal strip material against the bridge 46 (Fig. 2) when the upper assembly 110 is in the closed position as shown in Fig. 2. The yoke 90 actuated up by rocker arm 94 then forms wings 182 and 183 up around rib 134 of pressure pad 132. Referring to Figs. 1 and 3, blocks 114 and 115 retain a cutoff punch 135 providing a shear blade 136 received by the hole 72 of plate 60 and by the notch 49 of die block 48.

As shown in Fig. 11, holder 111 provides an opening 140 for receiving a tubular electrode holder 141 which supports an electrode 142 having a work engaging tip 143. The electrode 142 is received by a notch 144 provided by blocks 114 and 115. The tip 143 is in alignment with the tip 145 of electrode 53 (Fig. 19) which is supported by a tubular electrode holder 146 (Fig. 1).

The blocks 114 and 115 retain terminal wing crimping plates 154 and 155 which, respectively, cooperate with lower anvils 54 and 55 (Fig. 12). As shown in Fig. 13, the wire clamp 56 is guided for vertical movement by blocks 32 and 33. Spring 148 urges clamp 56 upwardly so that a flange 56a thereof engages a shoulder 149 of blocks 32 and 33. An upper wire clamping pad 156 is guided for vertical movement by block 117 and is urged downwardly by a spring 157 so that flanges 158 of this pad normally engage shoulders 159 of block 117. The members 56 and 156 provide interfitting notched portions 56n and 156n and cooperate to clamp the wire W (Fig. 4) between them at the time it is placed in the apparatus to receive the terminal T. During descent of the upper assembly 110, clamp 156 engages the wire supported by clamp 56 and forces the latter downwardly to cause a hole 161 thereof to align with a plunger 162 connected by a pin 163 with a lever 164 pivoted at 165 on a bracket 166. Lever 164 provides a slot 167 receiving a rod 168 extending through punch holder 111 and receiving nuts 169 at its upper end and nuts 170 at its lower end. A spring 171 surrounding rod 168 urges a washer 172 against holder 111 and a washer 173 against lever 64. When hole 161 of clamp 56 is aligned with plunger 162, spring 171 compresses to force the plunger 162 to the right so that the clamp 156 is retained in down position until after the holder 111 is near the end of its upward travel.

By a suitable feeding mechanism, the strip S (Fig. 4) is fed through the guiding channel provided by the plate 60 in conjunction with plates 32 and 33. Following successive operations of feeding the strip S, the dies cooperate to form progressively first a hole 180 and, at position t1, a terminal blank which includes a connecting neck 181 joining it to strip S, the hole 180 and pairs of wings 182 and 183. The apparatus shown in Figs. 2 and 8 bends the wings 182 and 183 upwardly to form the terminal as shown at position t2. The terminal moves to positions t3 and t4 without change in shape. After the terminal has been moved to position t4, the connecting neck 180 is removed by punch 136 (Fig. 9) so that the terminal at position t4 is separated from the supply strip. The terminal is moved to the final position t5 by being pushed by the adjacent terminal as it moves from position t3 to position t4. The terminal is guided to final position t5 by the rib 78 in Fig. 7. While the terminal is at the position t5, a wire W having a bared core core C is placed upon the clamp 56 while the assembly 110 is in upper position. Descent of assembly 110 effects crimping the wings 182 against the core C, crimping the wings 183 upon the insulation of the wire W and the welding of the core C to the flat portion of the terminal T. During movement of the terminal T from position t4 to position t5, the point 78p, rib 78 (Fig. 10), bears upon the terminal with pressure impressed by springs 81 thus providing friction resisting this movement of the terminal. Therefore the terminal is not pushed too far toward the left in Fig. 1.

While the die assembly 110 is up, a bar 200 (Fig. 5) is located above, in Fig. 5, the electrode tip 145 and to the right thereof in Fig. 1. Bar 200 is a stop which limits movement of the wire core C into the apparatus when the operator places wire W upon clamp 56 and holds it there during downward movement of the assembly 110 which is effected in consequence of engagement of the punch press clutch by a suitable control member such as a foot pedal or a lever operated by the free hand of the operator. By means disclosed in my copending application referred to, the stop bar 200 is retracted during downward movement of assembly 110.

Alignment of the upper assembly 110 relative to the lower assembly 30 is maintained by guide post 211 attached to the lower assembly and received by guide bushings 212 attached to the upper assembly.

In the form of the invention shown in Figs. 14–18 and 20–23, the parts which are similar in function to parts of the form previously described are marked with the same reference numbers with primes affixed. The second form disclosed herein makes from a strip S' (Fig. 17) a terminal T' which occupies successively six positions t1–t6. As shown in Figs. 14A and 20, between blocks 50' and 51', there is located a block 220 having a beveled surface 221 slanting from the level of upper surface of blocks 220 and 50' to a lower level of the upper surface of block 51'. In moving from position t4 to position t5, terminal T1 moves to a lower level and the hole 180' thereof is substantially aligned with a hole 222 in block 50'. A pad 224 supported by upper assembly 110' moves down and causes a pointed pilot pin 225 to engage the wall of hole 180' and align said hole with hole 222 while a spring 227 urges pin 225 down with yielding pressure. A rib 228 of pad 224 approaches closely to beveled surface 221 of block 220 to block the left movement of the terminal in position t4 so that shifting thereof longitudinally is prevented. In this station the end of the terminal at position t5 is coined as shown in Fig. 14A in order to remove the burr caused by the shearing punch 135' so that the terminal, when attached to wire W at position t6, can be inserted more easily into a terminal receiving socket.

In position t4, the terminal is pressed by rib 78' of bar 79' against blocks 50' and 220. In position t5, the terminal is pressed by rib 78'a of bar 79'a against block 51'. In position t6, the terminal is pressed by rib 78'a of bar 79'a against a bridge bar 230 supported by block 51'. In positions t4, t5 and t6, the terminal is pressed edgewise by an insert plate 231 (Figs. 18, 18B and 23) which is notched to provide clearance for pad 224 (Fig. 14) and urged against the terminal by springs 232, the ends of which are retained by sockets in plate 60' and in the plate 231. Plate 231 is retained in a recess 233 of plate 60' (Fig. 18B) by screws 234 (Fig. 18) which pass through slots 235 of plate 60' and which threadedly engage plate 231. Thus pressure is applied yieldingly vertically as well as horizontally to the terminal T' in positions t4, t5 and t6 to provide a friction-drag which prevents over-travel from these positions.

While the embodiments of the present invention as herein disclosed, constitute preferred forms, it is to be understood that other forms might be adopted.

What is claimed is as follows:

1. For use with a punch press having a fixed bed and a movable ram and means for intermittently feeding strip metal lengthwise, the combination comprising a base assembly adapted for mounting on the press bed and a head assembly adapted for support by the press ram, said assemblies having cooperating punches and dies which, respectively, are positioned at a plurality of different operating stations means for operating the movable ram to effect cooperative operation of said punches and dies to shape the strip to progressively form a terminal having a flat portion and a plurality of wings which extend substantially in parallelism from the flat portion to provide for attachment of the terminal to a wire having a bared core portion extending from the insulated portion of the wire said assemblies having, at the last operating station, means for crimping the wings around the wire and electrodes for welding the core to the terminal, said assemblies also having, at a station in advance of the last station, means for severing the terminal from the strip fed by the press before it is secured to the wire, said severed terminals being pushed to the last operating station by movement of the metal strip and said base assembly having means for guiding the severed terminals as they are moved to the last operating station and for maintaining the said terminals in proper location at said last operating station, said last-named means including a rib received between the wings of the terminal and engaging the flat portion thereof; and spring means urging the rib toward the terminal.

2. For use with a punch press having a fixed bed and a movable ram and means for intermittently feeding strip metal lengthwise, the combination comprising a base assembly adapted for mounting on the press bed and a head assembly adapted for support by the press ram, said assemblies having cooperating punches and dies which, respectively, are positioned at a plurality of different operating stations means for operating the movable ram to effect cooperative operation of said punches and dies to shape the strip to progressively form a terminal having a flat portion and a plurality of wings which extend substantially in parallelism from the flat portion to provide for attachment of the terminal to a wire having a bared core portion extending from the insulated portion of the wire, said assemblies having at the last operating station, means for crimping the wings around the wire and electrodes for welding the core to the terminal, said assemblies also having, at a station in advance of the last station, means for severing the terminal from the strip fed by the press before it is secured to the wire, said severed terminals being pushed to the last operating station by movement of the metal strip and said base assembly having means for guiding the severed terminals as they are moved to the last operating station and for maintaining said terminals in proper location at said last operating station, said last-named means including a rib received between the wings of the severed terminal, said rib being engaged by the severed terminal as it is moved to the next-to-last operating station and so positioned that it continues to engage the severed terminal at the last operating station, and spring means for urging the rib toward the terminals at said last-mentioned stations.

3. The combination defined by claim 2 further characterized by a pointed locating pin carried by the ram assembly for reception by a hole in the flat part of the terminal when at the next to the last station and means for coining one end of said flat part of said terminal when at said next to last station including a bevelled surface provided by the base assembly and a projection on the ram for engaging said flat part to force its end against said bevelled surface.

4. The combination defined by claim 2 further characterized by a base assembly which provides for support of the severed terminal after it is moved past the severing station at the same elevation as that of the terminal remaining attached to the strip metal and which has means for supporting the severed terminals at a lower level at the last two operating stations, and further characterized by a second rib received between the wings of the terminal at the station following the severing station and spring means for urging said second rib against said terminal.

5. The combination defined by claim 2 further characterized by a base assembly which provides for support of the severed terminal after it is moved past the severing station at the same elevation as that of the terminal remaining attached to the strip metal and which has means for supporting the severed terminals at a lower level at the last two operating stations, and further characterized by a second rib received between the wings of the terminal at the station following the severing station and spring means for urging said second rib against said terminal and further characterized by a pointed locating pin carried by the ram assembly for reception by a hole in the flat part of the terminal when at the next to the last station and means for coining one end of said flat part of said terminal when at said last-mentioned station including a bevelled surface provided by the base assembly and a projection on the ram for engaging said flat part to force its end against said bevelled surface.

References Cited in the file of this patent

UNITED STATES PATENTS

| Number | Name | Date |
|---|---|---|
| 1,248,576 | Trood | Dec. 4, 1917 |
| 1,504,612 | Feaster | Aug. 12, 1924 |
| 1,873,125 | Holmes et al. | Aug. 23, 1932 |
| 1,959,150 | Basch et al. | May 15, 1934 |
| 2,169,802 | Keller | Aug. 15, 1939 |
| 2,225,739 | Elliott | Dec. 24, 1940 |
| 2,278,300 | Barter et al. | Mar. 31, 1942 |
| 2,339,884 | Schlumpf | Jan. 25, 1944 |
| 2,494,137 | Martines | Jan. 10, 1950 |